United States Patent
Nishizawa et al.

[11] 3,760,201
[45] Sept. 18, 1973

[54] OPTICAL FLIP-FLOP ELEMENT
[75] Inventors: Jun-ichi Nishizawa; Kaoru Takahashi, both of Sendai, Japan
[73] Assignee: Semiconductor Research Foundation, Kawauchi, Sendai, Japan
[22] Filed: Sept. 16, 1971
[21] Appl. No.: 181,078

[52] U.S. Cl. .............................. 307/312, 331/94.5
[51] Int. Cl. ............................................ H03k 19/14
[58] Field of Search ..................................... 307/312

[56] References Cited
UNITED STATES PATENTS
| | | | |
|---|---|---|---|
| 3,427,563 | 2/1969 | Lasher | 307/312 |
| 3,439,289 | 4/1969 | Kosonocky | 302/312 |
| 3,509,384 | 4/1970 | Fowler et al. | 307/312 |
| 3,654,497 | 4/1972 | Dyment et al. | 307/312 |

OTHER PUBLICATIONS
Reimann et al., "IEEE Spectrum," March 1965, pp. 181–195 (pp. 189–195 relied on).

Primary Examiner—Roy Lake
Assistant Examiner—Darwin R. Hostetter
Attorney—Robert E. Burns et al.

[57] ABSTRACT

A semiconductor laser diode has two opposite parallel mirror end faces normal to its PN junction. With a forward current flowing through the PN junction, the application of an optical pulse to one of the mirror faces causes a sustained coherent light to be emitted through the other mirror face. When a coherent light from a similar diode falls upon the first diode, the latter terminates its emission. The pulse is again applied to the first diode to emit the coherent light from it. Thus both diodes form a FLIP-FLOP. Those two diodes may be formed in a single semiconductor wafer.

4 Claims, 7 Drawing Figures

3,760,201

OPTICAL FLIP-FLOP ELEMENT

BACKGROUND OF THE INVENTION

This invention relates to high speed optical logic elements and more particularly to high speed FLIP-FLOP elements utilizing, as a medium for transferring the information, optical energy rather than electrical energy.

Electronic computers lately continue to be strikingly developed and the demand therefor to be rendered large-scaled and rapid in operating speed is increasingly great from year to year. As far as the existing electronic computers utilize electrical energy as a medium through which the information enters, flows through and leaves, the computer it is necessary to effect wiring on the computer which, in turn, greatly contributes to the limitation of the operating speed thereof.

SUMMARY OF THE INVENTION

Accordingly it is an object of the invention to provide a new and improved high speed storage element utilizing a semiconductor laser diode for the purpose of realizing optical computers for effecting logic operation at high speeds in lieu of the existing electronic computers.

It is another object of the invention to provide a new and improved high speed FLIP-FLOP element utilizing semiconductor laser diodes.

According to the principles of the invention there is provided an optical storage element including a semiconductor laser diode having a pair of opposite parallel mirror end faces normal to a PN junction involved. With the diode biased with a forward current flowing through the PN junction and insufficient to emit a coherent light from the same, an optical signal in the form of a pulse is applied to one of the mirror end faces to cause coherent light to be emitted through the other mirror end face. Even after the termination of the optical signal, the coherent light continues to be emitted from the diode. That is, the diode functions to store the optical signal applied thereto. Then another optical signal, that may be a coherent light from a separate semiconductor laser, is applied to the first diode substantially perpendicularly to the optical axis of the coherent light being emitted from the latter. This causes that coherent light from the first diode to be extinguished. If the first optical signal is again applied to the first diode, the latter emits the coherent light. In other words, the first diodes has one operative state in which coherent light is emitted and the other operative state in which no coherent light is emitted exhibiting the FLIP-FLOP function.

BRIEF DESCRIPTION OF THE DRAWINGS

The invention will become more readily apparent from the following detailed description taken in conjunction with the accompanying drawings in which.

DESCRIPTION OF THE PREFERRED EMBODIMENTS

Figure 1:
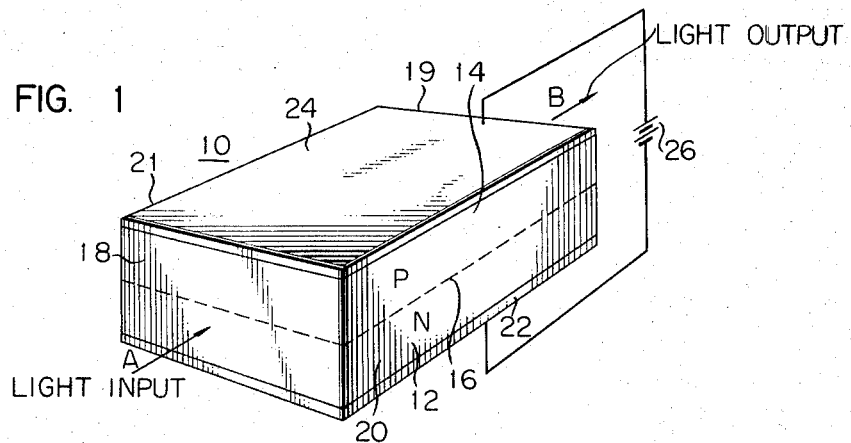
FIG. 1 is a perspective view of a semiconductor laser diode useful in explaining the fundamental operation of the invention with an electrically biasing circuit for the diode diagrammatically illustrated.

Referring now to the drawings and FIG. 1 in particular, there is shown a wafer of any suitable semiconductive material such as gallium arsenide (GaAs) generally designated by the reference numeral 10. The wafer 10 includes a semiconductor region 12 of one type conductivity, for example, an N type conductivity and a semiconductor region 14 of opposite or P type conductivity disposed upon the N type region 12 to form a PN junction 16 therebetween thereby to provide a semiconductor laser diode. The diode 10 may be formed of any semiconductive material high in luminescent efficiency and suitable examples thereof involve. $Ga_{1-x}Al_xAs$, $Ga_{1-x}In_xP$, InAs, InSb, etc. in addition to GaAs, where x is greater than zero and smaller than one.

The wafer 10 is shown in FIG. 1 as being of a rectangular section and includes a pair of opposite end faces 18 and 19 disposed in optically parallel relationship and finished into mirror surfaces through the utilization of cleavages of crystal or by a polishing technique well known in the art, and another pair of opposite end faces 20 and 21 disposed in substantially parallel relationship and formed into rough surfaces, for example by a sandblasting or etching technique. The mirror end faces and the general surface of the rough end faces are substantially perpendicular to the plane of the PN junction 16. Then a pair of metallic electrodes 22 and 24 are disposed in ohmic contact with the exposed surfaces of the N and P type regions 12 and 14 respectively and have electrically connected thereacross a biasing source 26 for forwardly biasing the PN junction 16 to cause a forward current to flow through the latter. The source 26 is preferably of a constant voltage type. If desired, the source 26 may be of a constant current type. Alternatively, a source of electric pulses may be used as the source 26 to perform the pulsed operation of the diode 10.

As will be well known in the art, the opposite mirror end faces 18 and 19 form a resonant cavity within the semiconductor diode therebetween responsive to an optical input to either one of the mirror surfaces to cause a laser oscillation and emit a coherent light through the other mirror end face. However, the opposite rough faces 20 and 21 are high in optical loss to form no resonant cavity therebetween whereby no laser oscillation takes place between the rough end faces 20 and 21. Namely, no coherent light is emitted through either of such end faces.

Semiconductor laser diodes such as shown in FIG. 1 exhibit a hysteresis effect whereby they exhibit a storage function. Briefly, a pair of semiconductor laser diodes are disposed within a single resonant cavity. With one of the diodes forwardly biased insufficient to emit a coherent light, the application of an electric current in the form of a pulse to the other diode causes it to emit a coherent light.

Even after the termination of the current pulse, the other diode continues to emit coherent light. That is, it exhibits a hysteresis effect. In other words, it stores the current pulse applied thereto. Further information may be found, for example, in G.J. Lasher's article entitled "GaAs Injection Lager with Novel Mode Control and Switching Properties" in Journal of Applied Physics, Vol. 36, No.2 pages 473 – 480 (1965).

Although FLIP-FLOP elements can be produced through the utilization of the storage function as previously suggested by one of the present applicants, the resulting elements will have an operating speed far less than that of semiconductor laser diodes involved which is considered to be in the order of $10^{-2}$ nanosecond or less. This is because the operating speed of the FLIP-FLOP elements is determined by the propagation velocity for the associated electric circuits including the wiring but not by the operating speed of the laser diodes.

The invention contemplates to provide high speed operational elements. It has been found that semiconductor laser diodes also exhibit a hysteresis effect with optical inputs applied to the diodes. In other words, the diode stores the optical input.

More specifically, if the PN junction 16 has flowing therethrough a forward current insufficient to emit a coherent light from the semiconductor laser diode 10 and if an optical signal designated by the arrow A in FIG. 1 is incident upon the mirror end face 18 of the diode 10 to reach the PN junction 16 then it travels toward the opposite mirror end face 19 while being amplified by the PN junction 16. Upon reaching the end face 19 the optical signal is partly transmitted through that face 19 while a great part thereof is reflected from the mirror face 19 toward the opposite mirror face 18. Then the reflected optical signal is again reflected from the mirror face 18 toward the mirror face 19. The process just described is repeated eventually to emit a beam of coherent light which is, in turn, transmitted through the end face 19 to provide an optical output designated at the arrow B in FIG. 1.

In this way, the optical signal A externally applied to the laser diode 10 has been amplified by the PN junction 16 to increase an energy of an electromagnetic field resulting from the optical signal A. The electromagnetic field thus established at the PN junction 16 in the laser diode 10 has a strength that is generally a function of the $n$th power of the amplitude of the optical input signal applied thereto where $n$ has a value equal to or more than two.

Figure 2:
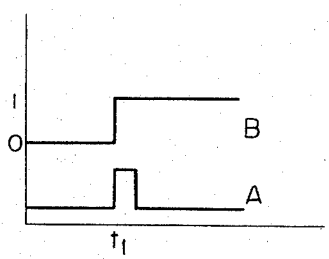
FIG. 2 is a graph illustrating the logic operation performed by the semiconductor laser diode shown in FIG. 1.
Figure 3:
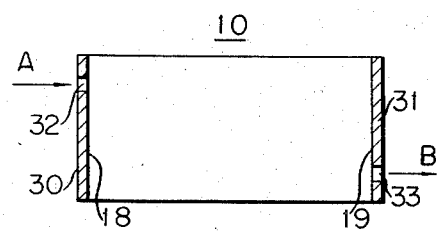
FIG. 3 is a schematic sectional plan view of a semiconductor laser diode constructed in accordance with the principles of the invention with the section taken in the plane of a PN junction disposed in the diode.

Assuming that when the diode 10 is emitting a coherent light or when it effects the laser emission, it is in a binary ONE state and that it emits no coherent light or when it effects the spontaneous emission it is in a binary ZERO state, the application of an optical pulse to the diode 10 causes the latter to be triggered from its ZERO and its ONE state as shown in FIG. 3 wherein the axis of ordinates represents the logic state of the diode and the axis of abscissas represents time. In FIG. 2, the optical pulse is shown as being applied to the diode at a time point of $t_1$ (waveform A). Then the diode 10 is triggered from its ZERO state where it effects the spontaneous emission to its ONE state where it effects the laser emission with a time delay of about $10^{-2}$ nanosecond equal to the operating speed of the diode (waveform B).

In order that semiconductor laser diodes such as the diode 10 are cuased to perform a storing operation, it is required to substantially decrease or minimize that portion of the energy of the electromagnetic field at the PN junction escaping to the exterior. To this end, a pair of opposite mirror end faces such as the end faces 18 and 19 of the diode 10 can be coated with any suitable metal high in reflective power, for example, gold, aluminum or the like. Alternatively, as shown in FIG. 3, a pair of opposite end faces 18 and 19 of a semiconductor laser diode 10 may be preferably coated with reflecting metallic layers 30 and 31 except for an entrance and exit pupils 32 and 33 respectively on the end faces for the purpose of increasing the reflective power of those end faces while minimizing a transmission loss on each of the end faces.

Figure 4:
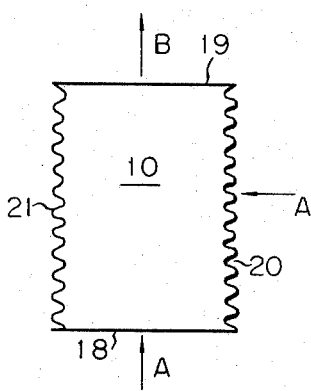
FIG. 4 is a diagrammatic sectional plan view of a semiconductor laser diode illustrating means for disabling the storing operation of the diode with the section taken in the plane of a PN junction disposed in the diode.

In order to disable the diode 10 from performing the storing operation as previously described, a strong beam of light which may be a beam of coherent light can be applied to either one of the opposite rough end faces of the diode. More specifically, it is assumed that an optical signal is applied to the mirror end face 18 of the laser diode 10, as shown at the arrow A in FIG. 4, thereby to cause a laser oscillation between the opposite mirror end faces 18 and 19 within the diode 10 to emit a beam of coherent light through the other mirror end face 19 as shown at the arrow B in FIG. 4. With the beam of coherent light thus emitted from the diode 10 through the mirror end face 19, a strong beam of light is caused to fall upon one of the rough end faces perpendicular to the mirror end faces, in this case, the rough end face 20 as shown at the arrow A in FIG. 4 to be incident upon the PN junction of the diode 10. The beam of incident light may be a beam of laser light. This causes the laser oscillation to be stopped. That is, the beam of coherent light B emitted through the mirror end face 19 is extinguished. This is known as the quenching effect that is described, for example, in Alan B Fowler article entitled "Quenching of Gallium Aresenide Injection Lasers," Journal of Applied Physics, Letter, Vol. III, pp. 1 – 3(1963).

The invention provides a FLIP-FLOP element utilizing the storing operation of a semiconductor laser diode as above described in combination with the quenching effect.

Figure 5:
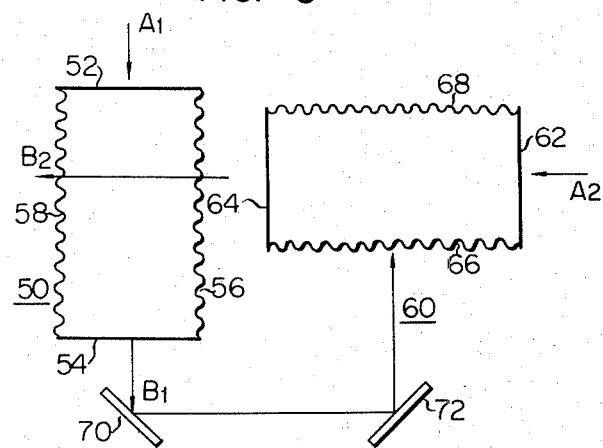
FIG. 5 is a view similar to FIG. 4 but illustrating a FLIP-FLOP element including a pair of semiconductor laser diodes and constructed in accordance with the principles of the invention.

FIG. 5 shows a FLIP-FLOP element constructed in accordance with the principles of the invention. The arrangement illustrated includes a pair of semiconductor laser diodes 50 and 60 each capable of emitting a beam of laser light or a beam of coherent light in one direction alone. Both the diodes are disposed such that the respective beams of coherent light are orthogonal to each other. Each of the diodes 50 and 60 may be identical to the diode 10 as shown in FIG. 1 and is shown as being of a rectangular cross section. The diode 50 includes a pair of opposite parallel mirror end faces 52 and 54 and a pair of opposite rough end faces 56 and 58 perpendicular to the mirror end faces with all the end faces substantially perpendicular to the PN junction (not shown) formed within the diode. The diode 60 includes a pair of opposite parallel mirror end faces 62 and 64 substantially perpendicular to its PN junction (not shown) and also to the mirror end faces 52 and 54 of the diode 50 while the remaining pair of opposite end faces 66 and 68 are rough. It is to be understood that both diodes include individual biassing means such as the electrodes 22 and 24 and the source 26 shown in FIG. 1.

It is assumed that each diode 50 or 60 has flowing through its PN junction a forward current insufficient to emit a beam of coherent light therefrom. Under the assumed condition, an optical signal $A_1$ is applied to the mirror end face 52 of the diode 50 to cause a laser oscillation between the mirror end faces 52 and 54 within the diode 50 to emit a beam of coherent light through the mirror end face 54 as shown at the arrow $B_1$ in FIG. 5.

The beam of coherent light from the mirror end face 54 is then reflected from a mirror 70 toward another mirror 72 which, in turn, reflects the beam of coherent light to fall it upon the rough face 66 of the diode 66 which serves to quench a laser oscillation within the diode 60, if present. After the incident optical signal $A_1$ has been interrupted the beam of coherent light $B_1$ continues to be emitted due to the storing operation of the diode 50 as above described. Then an optical signal $A_2$ in the form of a pulse is applied on the mirror end face 62 of the diode 60 to cause a laser oscillation between the mirror end faces 62 and 64 within the diode 60 to emit a beam of coherent light $B_2$ from the diode 60 through the mirror end face 64. The beam of coherent light $B_2$ enters the diode 50 through the rough end face 56 to terminate the laser oscillation between the mirror end faces 52 and 54 within the diode 50 due to the quenching effect. At the same time, the beam $B_2$ is passed through the diode 50 until it appears from the rough end face 58 of the diode 60 as shown at the arrow $B_2$ in FIG. 5. The beam $B_2$ continues to be emitted from the diode 60 through the end face 58 even after the pulse of optical signal $A_2$ has been extinguished.

Figure 6:
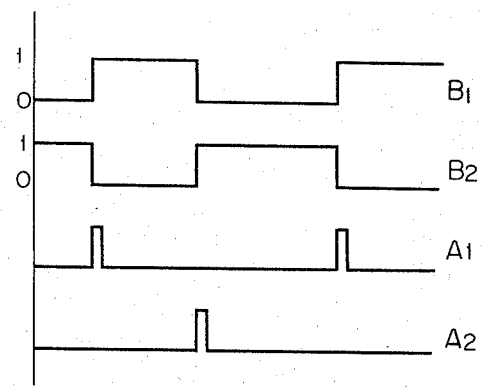
FIG. 6 is a graph representing the FLIP-FLOP operation of the FLIP-FLOP element shown in FIG. 6.

FIG. 6 is a graphic representation of a logic operation performed by the FLIP-FLOP element as above described in conjunction with FIG. 5. As shown in FIG. 6, an optical input signal $A_1$ in the form of a pulse is applied to the diode 50 to trigger it from a ZERO to a ONE state (waveform $B_1$) while at the same time the diode 60 is triggered from a ONE to ZERO state (waveform $B_2$). Also an optical input signal $A_2$ in the form of a pulse is applied to the diode 60 to trigger the diode 60 from ZERO to the ONE state. Simultaneously the diode 50 is triggered from a ONE to a ZERO. Then the succeeding optical pulse $A_1$ triggers the diode 50 from its ZERO to its ONE state.

Figure 7:
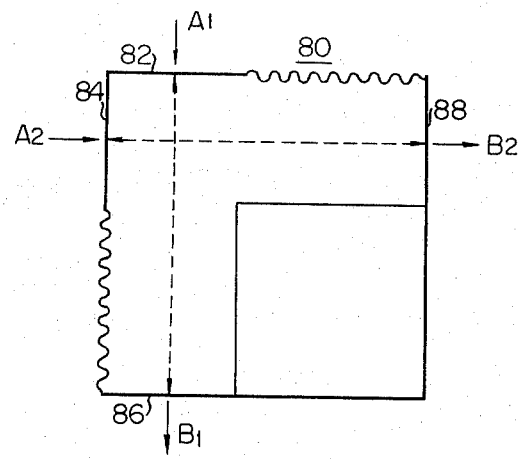
FIG. 7 is a view similar to FIG. 6 but illustrating a modification of the FLIP-FLOP element shown in FIG. 6.

FIG. 7 shows a modification of the invention wherein a pair of semiconductor laser diodes such as the diodes 50 and 60 are disposed within a single semiconductor wafer. In FIG. 7 a semiconductor wafer 80 is shown as being of a square cross section and includes one pair of adjacent lateral surfaces orthogonal to each other in one corner and provided on the respective halves near to that corner with individual mirror surfaces 82 and 84, and the other pair of adjacent lateral surfaces having individual mirror surfaces 86 and 88 opposite to and coextensive with the mirror surfaces 82 and 84 respectively. The mirror surfaces 82 and 84 have the respective rough surfaces contiguous thereto. Thus it will be appreciated that the mirror surfaces 82 and 86 form a resonant cavity for one of the laser diode while the mirror surfaces 84 and 88 form a resonant cavity for the other diode with both diodes having the optical axes orthogonal to each other. Both the diodes include an overlapped portion and a biassing means such as the electrodes 20 and 24 and the source 26 shown in FIG. 1. If desired, the wafer may be of a rectangular shape.

As shown in FIG. 7, an optical signal $A_1$ is applied to the mirror surface 82 to causes a laser oscillation between the mirror surfaces 82 and 86 to emit a coherent light $B_1$ through the mirror surface 86. Then another optical signal $A_2$ is applied to the mirror surface 84 to cause a laser oscillation between the mirror surfaces 84 and 88 to emit a coherent light $B_2$ through the mirror surface 88 and substantially orthogonally to the optical axis of the coherent light $B_1$. At the same time the coherent light $B_1$ is extinguished. Thereafter the application of the optical pulse $A_1$ to the mirror surface 82 causes the coherent light $B_{13}$ to disappear while the coherent light $B_1$ is emitted through the mirror surface 86. Thus it will be appreciated that the arrangement of FIG. 7 performs a FLIP-FLOP logic operation such as shown in FIG. 6.

What we claim is:

1. An optical logic element comprising, two semiconductor laser diodes, each semiconductor laser diode comprising reflective end faces defining therebetween a resonant cavity for emission of coherent light, each laser diode having a p-n junction disposed in a plane passing through said reflective end faces, said reflective end faces being disposed normal to said plane, biasing means for each laser diode so that a forward current flows through each p-n junction in operation and is insufficient to effect emission of coherent light from the individual diode but sufficient to sustain emission of coherent light upon termination of an input excitation light signal exciting the individual laser diode to emit coherent light, each laser diode having one of the reflective end faces disposed for receiving an input excitation light signal to produce a coherent light output from the other reflective end face, light-reflecting means coacting with said laser diodes and said laser diodes being arranged relative to each other and relative to said light-reflecting means for quenching of one of the laser diodes upon emission of coherent light by the other laser diode and application of the coherent light to said one laser diode for quenching thereof, whereby when said one of the diodes is excited by an input excitation light signal for emission of coherent light it emits coherent light including after the termination of the input excitation light signal and when said other laser diode is excited by an input excitation light signal for emission of coherent light it emits coherent light and quenches said one laser diode.

2. An optical logic element according to claim 1, in which said biasing means comprises ohmic contacts on each respective laser diode and means applying constant biasing electric energy thereto.

3. An optical logic element according to claim 1, in which said biasing means comprises a constant voltage source connected to apply a voltage below a threshold level of the individual diodes for emission of coherent light without application of said input excitation light signal, and said semiconductor laser diodes each having a composition effective to sustain coherent light emission upon termination of said input excitation light signal, and said voltage source applying a biasing voltage signal effective to sustain said coherent light emission for a period of time when said input excitation light signal is terminated.

4. An optical logic element according to claim 1, in which said laser diodes comprise a unitary semiconductor body.

* * * * *